United States Patent Office 2,870,021
Patented Jan. 20, 1959

2,870,021

STABILIZATION OF ORGANIC COMPOUNDS

William K. T. Gleim, Island Lake, Ill., assignor to Universal Oil Products Company, Des Plaines, Ill., a corporation of Delaware No Drawing. Application July 18, 1955
Serial No. 522,841

6 Claims. (Cl. 99—163)

This invention relates to stabilization of organic compounds which tend to deteriorate in storage or in use due to oxidation or other reactions.

The novel method of the present invention may be utilized for the stabilization of various organic materials which are subject to oxidative deterioration and include motor fuel, particularly unsaturated gasolines as, for example, cracked gasoline and polymer gasoline, diesel oil, mineral oil, lubricating oil, fuel oil, drying oil, greases, rubber, monomers including styrene, butadiene, etc., paraffin waxes, edible fats and oils, etc. These materials are adversely affected by oxygen, with the resultant formation of undesirable gum, discoloration, rancidity or other deleterious reactions.

The invention is particularly applicable to the stabilization of fatty materials including edible fats and oils which may be of animal, vegetable or mineral origin and which tend to become rancid especially during long periods of storage prior to use. Typical representatives of these edible fats and oils include linseed oil, menhaden oil, cod liver oil, castor oil, olive oil, rapeseed oil, coconut oil, palm oil, corn oil, sesame oil, peanut oil, babassu oil, butter, fat, lard, beef tallow, etc., as well as the hydrogenated oils. It is understood that other oils and fats may be treated within the scope of the present invention, including oils and fats which have previously been subjected to various treatments, such as blowing with air, heat treatment, etc.

It is therefore an object of this invention to provide a method for stabilizing organic compounds susceptible of oxidative deterioration.

Another object of this invention is to prepare compounds which are capable of retarding the oxidative deterioration of organic substances.

One embodiment of this invention resides in a process for preparing the condensation products of an allyloxy phenol and a compound selected from the group consisting of di- and trihydroxy benzenes by condensing said 4-allyloxy phenol and said benzene in the presence of an organic acid catalyst, and recovering the resultant condensation products.

Another embodiment of the invention resides in the process for preparing the condensation products of 4-methallylphenol or dimethallyloxy benzene and hydroquinone by condensing said 4-methallyloxy phenol and hydroquinone in the presence of formic acid, and recovering the resultant condensation products.

A specific embodiment of the invention is found in a method of stabilizing an organic material susceptible of deterioration due to oxygen by adding thereto the condensation products of the reaction between 4-methallyloxy phenol or dimethallyloxy-benzene and hydroquinone in an amount sufficient to retard said deterioration.

A more specific embodiment of the invention resides in a method for stabilizing lard by adding thereto from about 0.0001% to about 1% by weight of the condensation products of the reaction between 4-methallyloxy phenol and hydroquinone.

Other objects and embodiments will be referred to in the following further detailed description of the invention.

The oxidation inhibitors of the present invention comprise the condensation products of an allyloxy phenol which have been reacted with a di- or trihydroxy benzene. The preferred allyloxy compounds are selected from the group of compounds represented by the following formula:

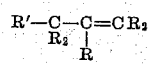

in which R may comprise a hydrogen, methyl, ethyl or propyl radical and R' may be either a hydroxyphenoxy, di-hydroxyphenoxy, substituted hydroxyphenoxy radical.

Examples of the above mentioned compounds include 4-allyloxy phenol, 2-allyloxy phenol, 4-allyloxy-2-hydroxy phenol, 4-methallyloxy phenol, di-allyloxy benzenes, di-methallyloxy benzenes.

It is to be understood that the above mentioned compounds are only examples of the types of compounds which may be condensed with a di- or trihydroxy benzene, and that the present invention is not necessarily limited thereto.

The aforementioned compounds are reacted with hydroquinone, catechol, pyrogallol, hydroxyhydroquinone, etc., in the presence of an organic acid catalyst. Examples of these catalysts which may be used in the present invention include formic acid, oxalic acid, trichloroacetic acid, etc.

The process of this invention is carried out at elevated temperatures, said temperatures being in a range of from about 50° C. to about 100° C., the preferred range being from about 80° C. to about 120° C.

The reaction between the mono- and di-allyl ethers of hydroquinone, catechol or hydroxyhydroquinone and the di- and trihydroxy benzenes may result in a reaction, or condensation product, which comprises a mixture of different compounds. An example of this is the reaction between the mono-methallyl-ether of hydroquinone and hydroquinone which may result in the formation of 1,1-dimethyl-1,2-bis(p-hydroxyphenoxy)ethane; 2[2-(p-hydroxyphenoxy)-t-butyl]-4-methallyloxyphenol; 2,5-bis[2-(p-hydroxyphenoxy) - t - butyl] - 4 - methallyloxyphenol; 2[2(p-hydroxyphenoxy)-t-butyl]-4-hydroxyphenol; 2,5-bis[2(p-hydroxyphenoxy)-t-butyl]-4-hydroxyphenol and 1,1-dimethyl - 1 - p - methallyloxy-phenoxy-2-p-hydroxyphenoxyethane. Therefore, in view of the resulting mixture, the oxidation inhibitors of this invention are merely designated as condensation products of the reaction between the mono- or diallyl ethers of hydroquinones, catechols or hydroxyhydroquinones and the di- and trihydroxy benzenes.

The condensation process of this invention may be effected in any suitable manner and may be either a batch or continuous type operation. When a batch type operation is used, the quantity of the starting materials, namely the mono- or diallyloxy compounds and the di- or trihydroxy benzene are placed in a reaction vessel along with the organic acid catalyst and condensed at the elevated temperatures hereinbefore set forth. After a predetermined reaction time, the reactor and the contents thereof are allowed to cool to room temperature and the condensation products separated from the unreacted material by conventional means, while said unreacted materials may be recycled for further use.

Another process is of the continuous type. In this method the starting materials are continuously charged to the reactor which is maintained at the proper operating conditions of temperature and pressure as separate streams or, in the alternative, may be combined before being charged to the reactor. At the same time the organic acid catalyst is also continuously charged into the reactor through a separate stream. The reaction zone in which the condensation takes place may be an unpacked vessel or coil or it may contain an adsorbent packing material such as fire brick, alumina, dehydrated bauxite, and the like. When the reaction has proceeded to completion, the condensation products thereof are continuously withdrawn from the reaction zone and separated from the unreacted starting materials, which are recycled for reuse as a portion of the feed stock.

The inhibitor of the present invention is generally added to the organic material in amounts of less than 1% by weight and preferably in an amount of from about 0.0001% to about 1% by weight. When used in edible fats and oils the inhibitor will generally be employed in amounts of from about 0.0001% to about 0.5% by weight and when used in gasoline the inhibitor will generally be used in amounts above about 0.02% by weight. The inhibitor may be used alone or in conjunction with synergists, inhibitor activators, dyes, antiknock agents, etc., depending upon the material to be stabilized. For example, when used in edible fats and oils, a synergist such as phosphoric acid, ascorbic acid, etc., will generally be used along with the inhibitor, the synergist usually being added in amounts within the range of from about 0.0001% to about 0.5%. When used in gasoline, lead tetraethyl, a dye and perhaps an inhibitor activator, such as certain types of alkylene polyamines, may be used.

The following examples are given to illustrate the process of the present invention which, however, are not intended to limit the generally broad scope of the present invention in strict accordance therewith.

EXAMPLE I 0.1 mol of 4-methallyloxyphenol was refluxed along with 0.1 mol of hydroquinone in 50 cc. of 88% formic acid. At the end of this time the condensation product was subjected to fractional distillation and separated from the unreacted 4-methallyloxy phenol and hydroquinone.

EXAMPLE II

The condensation products of 4-methallyloxyphenol and hydroquinone prepared in the above manner were utilized in a concentration of 0.005% and 0.02% by weight for the stabilization of lard which, without inhibitor, had a stability period of 4.5 hours as determined by the "Swift" test, hereinafter also referred to as the A. O. M. (Active Oxygen Method). The test is described in detail in the article by A. E. King, H. L. Roschen and W. H. Irwin, which appeared in the "Oil and Soap," vol. X, No. 6, pages 106–109 (1933), and modified as described in the article by R. W. Reimenschneider, J. Turer and R. M. Spec, which appeared in the "Oil and Soap," pages 169–171, September 1943. In general, this test comprises bubbling air through a sample of the lard until rancidity is determined organoleptically and by peroxide values. The results of these tests are shown in Table I below.

Table I

| Concentration of inhibitor in lard, percent by weight | Induction period, hours |
|---|---|
| 0 | 4.5 |
| 0.005 | 30 |
| 0.01 | 110–120 |
| 0.02 | 122–138 |

EXAMPLE III 1 mol 1,4-dimethallyloxybenzene and 2 mol of hydroquinone were condensed by refluxing the mixture in 50 cc. of 88% formic acid. The condensation products were separated from the unreacted starting materials by fractional distillation.

A portion of the recovered condensation products was alkylated with t-butyl alcohol in the presence of phosphoric acid at a temperature of approximately 70–80° C., the t-butyl derivatives of the condensation products being recovered therefrom.

EXAMPLE IV

The condensation products of 1,4-dimethallyloxybenzene and hydroquinone, and the t-butyl derivatives thereof were tested as inhibitors in gasoline. The results of these tests are shown in Table II below.

Table II

| Inhibitor | Concentration of inhibitor, percent by weight | Induction period, minutes |
|---|---|---|
| Blank | | 50 |
| Condensation products of dimethallyloxyhydroquinone and hydroquinone | 0.025 | 280 |
| t-butyl derivatives of the abovementioned condensation products | 0.025 | 345 |

I claim as my invention:

1. An organic substance selected from the group consisting of hydrocarbon and fatty materials tending to deteriorate due to oxygen containing the condensation products of an allyloxy phenol and a compound selected from the group consisting of di- and trihydroxy benzenes in a sufficient amount to retard said deterioration.

2. An organic substance selected from the group consisting of hydrocarbon and fatty materials tending to deteriorate due to oxygen containing the condensation products of methallyloxyhydroquinone and a compound selected from the group consisting of di- and trihydroxy benzenes in a sufficient amount to retard said deterioration.

3. An organic substance selected from the group consisting of hydrocarbon and fatty materials tending to deteriorate due to oxygen containing the condensation products of methallyloxy phenol and hydroquinone in a sufficient amount to retard said deterioration.

4. Lard tending to become rancid containing from about 0.001% to about 1% by weight of the condensation products of methallyloxyhydroquinone and hydroquinone.

5. Gasoline tending to deteriorate due to oxygen containing the condensation products of di(methallyloxy)-hydroquinone and hydroquinone in an amount sufficient to retard said deterioration.

6. Gasoline tending to deteriorate containing from about 0.01% to about 1% by weight of the condensation products of di(methallyloxy)hydroquinone and hydroquinone.

References Cited in the file of this patent

UNITED STATES PATENTS

| | | |
|---|---|---|
| 2,378,698 | Gibbs | June 19, 1945 |
| 2,579,330 | Martin | Dec. 18, 1951 |
| 2,591,651 | Young | Apr. 1, 1952 |
| 2,648,608 | Beadle et al. | Aug. 11, 1953 |
| 2,688,625 | Bell et al. | Sept. 7, 1954 |